(12) United States Patent
Arthur et al.

(10) Patent No.: US 6,252,022 B1
(45) Date of Patent: Jun. 26, 2001

(54) MOLECULAR WEIGHT CONTROL IN OLEFIN POLYMERIZATION

(75) Inventors: Samuel David Arthur; Joel David Citron, both of Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/317,104

(22) Filed: May 21, 1999

Related U.S. Application Data

(60) Provisional application No. 60/087,296, filed on May 29, 1998.

(51) Int. Cl.7 ......................................................... C08F 4/80
(52) U.S. Cl. ...................... 526/172; 526/161; 526/169.1; 526/171; 502/155
(58) Field of Search ............................... 526/161, 169.1, 526/171, 172, 905; 502/155

(56) References Cited

U.S. PATENT DOCUMENTS 5,955,555 * 9/1999 Bennett ................................. 526/133
6,031,057 * 2/2000 Lippert et al. ........................ 526/171
6,087,292 * 7/2000 Winter et al. ......................... 502/117
6,107,232 * 8/2000 Yokota et al. ........................ 502/155

FOREIGN PATENT DOCUMENTS

WO 98/27124   6/1998   (WO).
WO 98/38228   9/1998   (WO).
WO 99/12981   3/1999   (WO).

OTHER PUBLICATIONS

Britovsek et al., Novel olefin polymerization catalysts based on iron and cobalt, Chem. Commun. p. 849–850, Apr. 1998.*

PCT/US 99/11556 PCT International Search Report dated Sep. 14, 1999.

* cited by examiner

*Primary Examiner*—David W. Wu
*Assistant Examiner*—R. Rabago

(57) ABSTRACT

The molecular weight of polyolefins produced using iron or cobalt complexes of 2,6-pyridinecarboxaldehyde diimines or a 2,6-diacylpyridine diimines as polymerization catalysts may be lowered by carrying out the polymerization in the presence of hydrogen.

16 Claims, No Drawings

MOLECULAR WEIGHT CONTROL IN OLEFIN POLYMERIZATION

This application claims the benefit of application Ser. No. 60/087,296 filed May 29, 1998, now pending.

FIELD OF THE INVENTION

In olefin polymerizations in which iron or cobalt complexes of 2,6-pyridinecarboxaldehyde diimines or 2,6-diacylpyridine diimines are used as polymerization catalysts, hydrogen may be used as a chain transfer agent to reduce polyolefin molecular weight.

TECHNICAL BACKGROUND

Polymerization of olefins using early transition metal containing catalysts such as vanadium and zirconium is a well known and commercially important technology. In many instances it is desirable to lower the molecular weight of the polyolefin that would normally be produced. For example lower molecular weight polymers are usually considered easier to melt process, since they have lower melt viscosities. While polymerization process conditions can sometimes be altered to change the molecular weight of the resulting olefin, often a chain transfer agent such as hydrogen is deliberately added to the process to lower the polyolefin molecular weight.

The polymerization of olefins, especially ethylene and propylene, using iron or cobalt complexes of 2,6-pyridinecarboxaldehyde diimines or 2,6-diacylpyridine diimines containing catalysts, see for instance U.S. patent applications Ser. No. 08/991,372, filed Dec. 16, 1997 (now U.S. Pat. No. 5,955,555), and Ser. No. 09/006,031, filed Jan. 12, 1998 (now U.S. Pat. No. 6,150,482). However, methods for lowering the molecular weight of polyolefins produced in such processes are not known (except that decreasing the steric bulk of the ligand often results in lower molecular weight polymer).

SUMMARY OF THE INVENTION

This invention concerns a process for the polymerization of a polymerizable olefin using as a polymerization catalyst an iron or cobalt complex of a 2,6-pyridinecarboxaldehyde diimine or a 2,6-diacylpyridine diimine, wherein the improvement comprises, using as a chain transfer agent an effective amount of hydrogen.

This invention also concerns a process for the polymerization of one or more polymerizable olefins, comprising, contacting under polymerizing conditions:

(a) one or more polymerizable olefins;

(b) hydrogen in an amount effective as a chain transfer agent; and (c) an active polymerization catalyst which contains an iron or cobalt complex of a 2,6-pyridinecarboxaldehyde diimine or a 2,6-diacylpyridine diimine.

DETAILS OF THE INVENTION

In the polymerization processes and catalyst compositions described herein certain groups may be present. By hydrocarbyl is meant a univalent radical containing only carbon and hydrogen. By saturated hydrocarbyl is meant a univalent radical which contains only carbon and hydrogen, and contains no carbon-carbon double bonds, triple bonds and aromatic groups. By substituted hydrocarbyl herein is meant a hydrocarbyl group which contains one or more (types of) substitutents that does not interfere with the operation of the polymerization catalyst system. Suitable substituents in some polymerizations may include some or all of halo, ester, keto (oxo), amino, imino, carboxyl, phosphite, phosphonite, phosphine, phosphinite, thioether, amide, nitrile, and ether. Preferred substituents are halo, ester, amino, imino, carboxyl, phosphite, phosphonite, phosphine, phosphinite, thioether, and amide. Which substitutents are useful in which polymerizations may in some cases be determined by reference to U.S. patent application Ser. No. 08/991,372, filed Dec. 16, 1997 (now U.S. Pat. No. 5,955,555), and Ser. No. 09/006,031, filed Jan. 12, 1998 (now U.S. Pat. No. 6,150,482), which are hereby included by reference. If not otherwise stated, hydrocarbyl, substituted hydrocarbyl and all other groups containing carbon atoms, such as alkyl, preferably contain 1 to 20 carbon atoms.

Noncoordinating ions are mentioned and useful herein. Such anions are well known to the artisan, see for instance W. Beck., et al., Chem. Rev., vol. 88, p. 1405–1421 (1988), and S. H. Strauss, Chem. Rev., vol. 93, p. 927–942 (1993), both of which are hereby included by reference. Relative coordinating abilities of such noncoordinating anions are described in these references, Beck at p. 1411, and Strauss at p. 932, Table III. Useful noncoordinating anions include $SbF_6^-$, BAF, $PF_6^-$, or $BF_4^-$, wherein BAF is tetrakis[3,5-bis(trifluoromethyl)phenyl]borate.

A neutral Lewis acid or a cationic Lewis or Bronsted acid whose counterion is a weakly coordinating anion may also present as part of the catalyst system. By a "neutral Lewis acid" is meant a compound which is a Lewis acid capable of abstracting X from (I) to form a weakly coordinating anion.

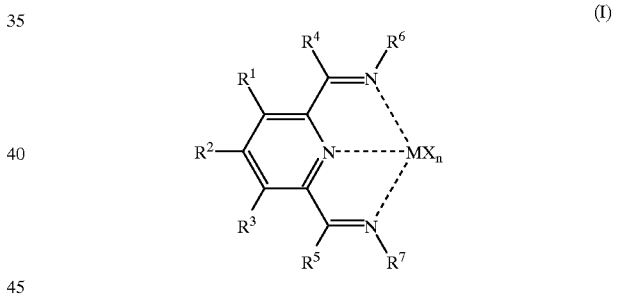

(I)

In (I), M is Co or Fe, each X is independently an anion and each X is such that the total negative charges on X equal the oxidation state of M (for $R^1$ through $R^7$ see below). The neutral Lewis acid is originally uncharged (i.e., not ionic). Suitable neutral Lewis acids include $SbF_5$, $Ar_3B$ (wherein Ar is aryl), and $BF_3$. By a cationic Lewis acid is meant a cation with a positive charge such as $Ag^+$, $H^+$, and $Na^+$.

A preferred neutral Lewis acid, which can alkylate the metal, is a selected alkyl aluminum compound, such as $R^9{}_3Al$, $R^9{}_2AlCl$, $R^9AlCl_2$, and "$R^9AlO$" (alkylaluminoxanes), wherein $R^9$ is alkyl containing 1 to 25 carbon atoms, preferably 1 to 4 carbon atoms. Suitable alkyl aluminum compounds include methylaluminoxane (which is an oligomer with the general formula $[MeAlOn]_n$), $(C_2H_5)_2AlCl$, $C_2H_5AlCl_2$, and $[(CH_3)_2CHCH_2]_3Al$. Metal hydrides such as $NaBH_4$ may be used to bond hydride groups to the metal M.

By an iron or cobalt complex of a 2,6-pyridinecarboxaldehyde diimine or a 2,6-diacylpyridine diimine is meant a Fe or Co complex of a ligand of the formula:

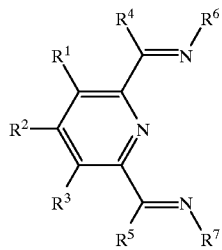

wherein:
$R^1$, $R^2$ and $R^3$ are each independently hydrogen, hydrocarbyl, substituted hydrocarbyl, or an inert functional group;
$R^4$ and $R^5$ are each independently hydrogen, hydrocarbyl, an inert functional group or substituted hydrocarbyl; and For compounds such as (I) and (II) and similar compounds, preferred formulas are found in U.S. patent applications Ser. No. 08/991,372, filed Dec. 16, 1997 (now U.S. Pat. No. 5,955,555), and Ser. No. 09/006,031, filed Jan. 12, 1998 (now U.S. Pat. No. 6,150,482), both of which are hereby included by reference, and preferred groupings and compounds in these applications are also preferred herein. However the compound numbers and group (i.e., $R^x$) numbers in these Applications may vary from those herein, but they are readily convertible. These applications also describe synthesis of the various ligands and iron and cobalt complexes.

In one type of preferred compound such as (I) or (II) $R^1$, $R^2$ and $R^3$ are hydrogen, and/or $R^4$ and $R^5$ are each independently hydrogen or alkyl, especially hydrogen or methyl, and/or $R^6$ is

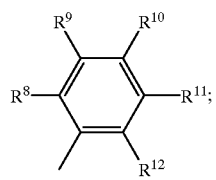

and/or $R^7$ is

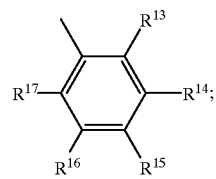

wherein:
$R^8$ and $R^{13}$ are each independently hydrocarbyl, substituted hydrocarbyl or an inert functional group;
$R^9$, $R^{10}$, $R^{11}$, $R^{14}$, $R^{15}$ and $R^{16}$ are each independently hydrogen, hydrocarbyl, substituted hydrocarbyl or an inert functional group;
$R^{12}$ and $R^{17}$ are each independently hydrogen, hydrocarbyl, substituted hydrocarbyl or an inert functional group;
and provided that any two of $R^8$, $R^9$, $R^{10}$, $R^{11}$, $R^{12}$, $R^{13}$, $R^{14}$, $R^{15}$, $R^{16}$ and $R^{17}$ that are vicinal to one another, taken together may form a ring.

There are many different ways of preparing the active polymerization catalysts of iron and cobalt which are used herein, many of which are described in U.S. patent applications Ser. No. 08/991,372, filed Dec. 16, 1997 (now U.S. Pat. No. 5,955,555), and 09/006,031, filed Jan. 12, 1998 (now U.S. Pat. No. 6,150,482), and those so described are applicable herein. "Pure" compounds which themselves may be active polymerization catalysts may be used, or the active polymerization catalyst may be prepared in situ by a variety of methods. Other methods for preparing active polymerization catalyst will be found in this patent application and in the Examples herein.

Which active polymerization catalysts will polymerize which olefins (not all catalysts will polymerize all olefins or combinations of olefins) will also be found in U.S. patent applications Ser. No. 08/991,372, filed Dec. 16, 1997 (now U.S. Pat. No. 5,955,555), and Ser. No. 09/006,031, filed Jan. 12, 1998 (now U.S. Pat. No. 6,150,482). Monomers useful herein include ethylene and propylene, and ethylene is preferred.

When hydrogen is used as the chain transfer agent it is preferably that the amount of hydrogen present be about 0.1 to about 80 mole percent of the olefin present, preferably about 1 to about 20 mole percent.

Suitable and preferred conditions for the polymerizations may be found in U.S. patent applications Ser. No. 08/991,372, filed Dec. 16, 1997 (now U.S. Pat. No. 5,955,555), and 09/006,031, filed Jan. 12, 1998 (now U.S. Pat. No. 6,150,482). The polymerization may be carried out in any manner of ways known in the art, for example batch or continuous, slurry, gas phase, or solution, and the catalyst may or may not be supported, or any suitable combination of these.

The polymer produced are useful as molding and extrusion resin, for example to make packaging films, bottles, and mechanical parts.

In the Example and Comparative Example all pressure are gauge pressure. "THF" is tetrahydrofuran. Relative molecular weights were judged by measuring the melt index of the polymer, according to ASTM D1238-95, Procedure A. The higher the melt index, the lower the molecular weight.

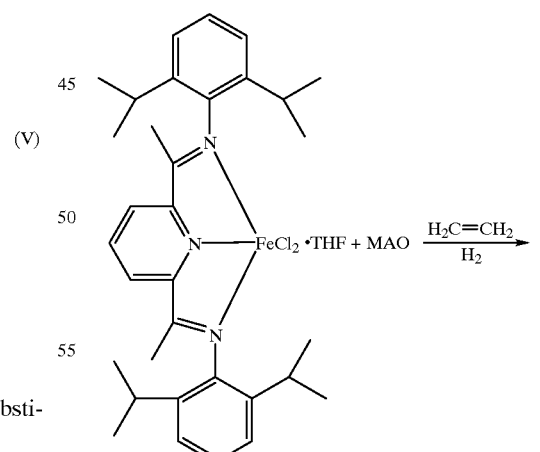

A 600-mL Parr® stirred autoclave was loaded with 200 mL dry hexane containing 1.0 mL MMAO-3A (1.7M in heptane; Akzo modified methylalumoxane; contains about 30% isobutyl groups) and 0.2 mL triisobutylaluminum (1.0 M in toluene) under nitrogen. The nitrogen was displaced by pressuring to 1.03 MPa with ethylene and venting 3 times. Then a toluene solution of 1 mg (III) (0.00147 mmol) was quickly injected through a head port. The autoclave was sealed and immediately pressured to 140 kPa with hydrogen; the pressure was then increased to 1.03 MPa with ethylene (giving 13 mol% hydrogen in the gas phase) and was stirred for 30 min with continual ethylene feed (no additional hydrogen). The autoclave internal temperature rose from 18° C. to 46° C. over the first minute and was thereafter maintained around 50° C. After 30 min the ethylene was vented and the resulting clear suspension of fine white polyethylene powder was suction-filtered and vacuum oven-dried to yield 15.0 g polyethylene powder. Melt index (190° C., 2160-g wt): 32 g/10 min.

Comparative Example 1

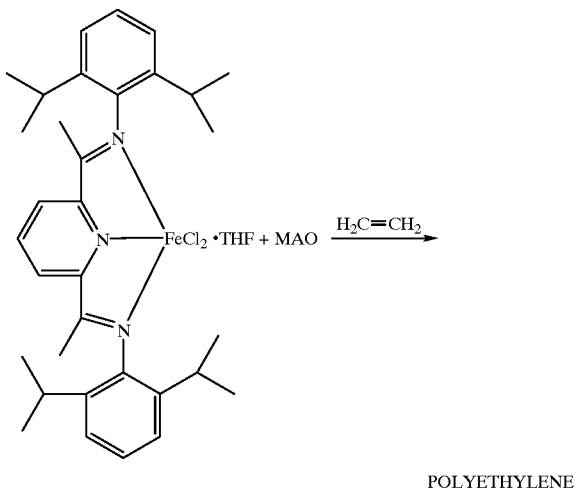

A 600-mL Parr® stirred autoclave was loaded with 200 mL dry hexane containing 1.0 mL MMAO-3A (1.7M in heptane; Akzo modified methylalumoxane; contains about 30% isobutyl groups) and 0.2 mL triisobutylaluminum (1.0M in toluene) under nitrogen. The nitrogen was displaced by pressuring to 1.03 MPa with ethylene and venting 3 times. Then a toluene solution of 1 mg (III) (0.00147 mmol) was quickly injected through a head port. The autoclave was immediately pressured to 1.03 MPa with ethylene and was stirred for 30 min with continual ethylene feed. The autoclave internal temperature rose from 22° C. to a peak of 55° C. over the first 3 minutes and was thereafter maintained around 50° C. After 30 min the ethylene was vented and the resulting clear suspension of fine white polyethylene powder was suction-filtered and vacuum oven-dried to yield 14.9 g polyethylene powder. Melt index (190° C., 2160-g wt): 1.05 g/10 min.

What is claimed is:

1. A process for the polymerization of a polymerizable olefin using as a polymerization catalyst an iron or cobalt complex of a 2,6-pyridinecarboxaldehyde diimine or a 2,6-diacylpyridine diimine, wherein the improvement comprises, using as a chain transfer agent an effective amount of hydrogen.

2. A process for the polymerization of one or more polymerizable olefins, comprising, contacting under polymerizing conditions:

(a) one or more polymerizable olefins;
(b) hydrogen in an amount effective as a chain transfer agent;
(c) an active polymerization catalyst which contains an iron or cobalt complex of a 2,6-pyridinecarboxaldehyde diimine or a 2,6-diacylpyridine diimine.

3. The process as recited in claim 1 or 2 wherein said 2,6-pyridinecarboxaldehyde diimine or 2,6-diacylpyridine diimine is of the formula

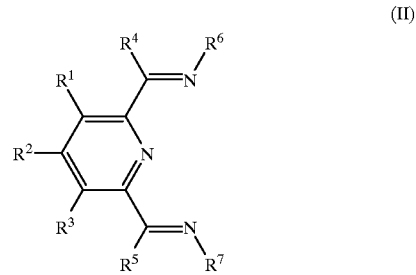

wherein:
$R^1$, $R^2$ and $R^3$ are each independently hydrogen, hydrocarbyl, substituted hydrocarbyl, or an inert functional group;
$R^4$ and $R^5$ are each independently hydrogen, hydrocarbyl, an inert functional group or substituted hydrocarbyl; and
$R^6$ and $R^7$ are aryl or substituted aryl.

4. The process as recited in claim 1 or 2 wherein said polymerizable olefin is ethylene.

5. The process as recited in claim 4 wherein said complex is an iron complex.

6. The process as recited in claim 3 wherein:
$R^1$, $R^2$ and $R^3$ are hydrogen;
$R^4$ and $R^5$ are each independently hydrogen or alkyl;
$R^6$ is

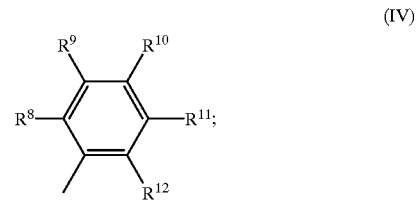

and $R^7$ is

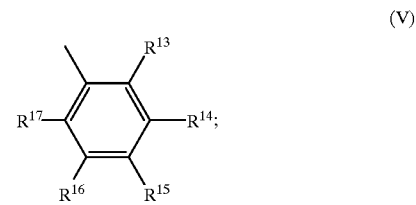

wherein:
$R^8$ and $R^{13}$ are each independently hydrocarbyl, substituted hydrocarbyl or an inert functional group;
$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group; and provided that any two of $R^8$, $R^9$, $R^{10}$, $R^{11}$, $R^{12}$, $R^{13}$, $R^{14}$, $R^{15}$, $R^{16}$ and $R^{17}$ that are vicinal to one another, taken together may form a ring.

7. The process as recited in claim 1 wherein said hydrogen is about 0.1 to about 80 mole percent of said polymerizable olefin.

8. The process as recited in claim 7 wherein said hydrogen is about 1 to about 20 mole percent of said polymerizable olefin.

9. The process as recited in claim 7 wherein said olefin is ethylene.

10. The process as recited in claim 8 wherein said olefin is ethylene.

11. The process as recited in claim 2 wherein said hydrogen is about 0.1 to about 80 mole percent of said polymerizable olefin.

12. The process as recited in claim 11 wherein said hydrogen is about 1 to about 20 mole percent of said polymerizable olefin.

13. The process as recited in claim 11 wherein said olefin is ethylene.

14. The process as recited in claim 12 wherein said olefin is ethylene.

15. The process as recited in claim 2, conducted under solution or slurry polymerization conditions.

16. The process as recited in claim 11, conducted under solution or slurry polymerization conditions.

* * * * *